United States Patent
Simonato et al.

(10) Patent No.: US 9,606,378 B2
(45) Date of Patent: Mar. 28, 2017

(54) DISPLAY SCREEN AND ITS MANUFACTURING PROCESS

(71) Applicant: COMMISSARIAT A L'ENERGIE ATOMIQUE ET AUX ENE ALT, Paris (FR)

(72) Inventors: Jean-Pierre Simonato, Sassenage (FR); Alexandre Carella, Mazeres Lezons (FR); Caroline Celle, Firminy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 59 days.

(21) Appl. No.: 14/377,993

(22) PCT Filed: Feb. 14, 2013

(86) PCT No.: PCT/IB2013/051192
§ 371 (c)(1),
(2) Date: Aug. 11, 2014

(87) PCT Pub. No.: WO2013/121367
PCT Pub. Date: Aug. 22, 2013

(65) Prior Publication Data
US 2015/0286077 A1 Oct. 8, 2015

(30) Foreign Application Priority Data
Feb. 16, 2012 (FR) ...................... 12 51440

(51) Int. Cl.
*G02F 1/01* (2006.01)
*B32B 17/10* (2006.01)
*G02F 1/13* (2006.01)
*G02F 1/00* (2006.01)
*B82Y 15/00* (2011.01)

(52) U.S. Cl.
CPC ............ *G02F 1/0147* (2013.01); *G02F 1/009* (2013.01); *G02F 1/132* (2013.01); *B32B 17/10477* (2013.01); *B82Y 15/00* (2013.01); *G02F 2201/12* (2013.01); *Y10S 977/723* (2013.01); *Y10S 977/762* (2013.01); *Y10S 977/83* (2013.01)

(58) Field of Classification Search
CPC ......... B32B 17/10477; B32B 17/10651; G02F 1/0147; H01L 2924/0002

USPC ......................................... 359/288; 345/106
See application file for complete search history.

(56) References Cited

U.S. PATENT DOCUMENTS

| | | | | |
|---|---|---|---|---|
| 7,416,993 B2* | 8/2008 | Segal | ..................... | B82Y 10/00 438/742 |
| 8,268,412 B2* | 9/2012 | Yang | ................. | G02F 1/136209 359/288 |
| 2009/0225310 A1* | 9/2009 | Yang | .................... | G01N 21/658 356/301 |
| 2009/0311530 A1* | 12/2009 | Hirai | ........................ | B22F 9/24 428/401 |
| 2010/0220379 A1* | 9/2010 | Liu | ....................... | G02F 1/0147 359/288 |
| 2011/0149373 A1* | 6/2011 | Liu | ....................... | G02F 1/0147 359/288 |
| 2012/0228668 A1* | 9/2012 | Thoumazet | ......... | C23C 16/0245 257/100 |
| 2013/0160608 A1 | 6/2013 | Nusko et al. | | |

FOREIGN PATENT DOCUMENTS

| | | | |
|---|---|---|---|
| DE | 10 2010 017 706 | 1/2012 | |
| JP | 2010-103041 | 5/2010 | |

OTHER PUBLICATIONS

International Search Report issued May 19, 2014, in PCT/IB13/051192, filed Feb. 14, 2013.

Liu, L., et al. "Paperlike thermochromic display", Applied Physics Letter, vol. 90, No. 21, pp. 213508-1-213508-3, XP012094994, 2007.

* cited by examiner

*Primary Examiner* — Scott J Sugarman
*Assistant Examiner* — Alberto Betancourt
(74) *Attorney, Agent, or Firm* — Oblon, McClelland, Maier & Neustadt, L.L.P.

(57) ABSTRACT

The invention relates to a display screen and its manufacturing process. The display screen of the invention comprises: a substrate made of a plastic; at least one transparent heating element; and at least one thermochromic compound, and is characterized in that the at least one transparent heating element comprises at least one optionally functionalized metal nanowire. The invention in particular has applications in the electronics industry.

23 Claims, No Drawings

DISPLAY SCREEN AND ITS MANUFACTURING PROCESS

The invention relates to a display screen and to a process for the manufacture of this display screen.

Within the meaning of the invention, a display screen is a flat or nonflat surface on which one or more color(s) or transparencies can be activated as a function of an external stimulus or several external stimuli.

A large number of display screens available on the market or in development exist today. Some of these display screens are already produced on conformable or pliable plastics, the colors of which are in particular obtained by the application of an electric current which generates heat and which brings about a change in the color of thermochromic inks as a function of the temperature. For this, use is made of electrodes which act as heating elements.

The transparent electrodes normally used are manufactured from metal oxides, such as indium tin oxide (ITO) or fluorine-doped tin oxide. However, these transparent electrodes are not flexible: they lose their conduction performance when they are repeatedly subjected to bending with small radii of curvature, for example less than 8 mm.

Recent advances in the field of nanotechnologies have meant that a certain number of transparent electrodes have been proposed based on carbon nanotubes, on graphene, on polymer (of PEDOT:PSS type) or on metal nanowires, essentially made of silver. These transparent electrodes can be produced on transparent plastic films and can thus be identified as flexible transparent electrodes.

Nevertheless, these transparent electrodes have a relatively mediocre stability. This is because the polymers are sensitive to chemical and electrical stresses and to ultraviolet radiation, the conductivity of a carbon nanotube and graphene is detrimentally affected to a large extent when these compounds are brought into contact with certain chemical compounds. Furthermore, these techniques all exhibit high sheet resistances, typically of greater than 100 ohm/square when the transmission of visible light is greater than 90%, unless dopings are carried out or unless manufacturing conditions are used which are incompatible with large volume production.

Thus, these electrodes, which are transparent heating elements, cannot be brought close to thermochromic compounds (organic compounds, inorganic compounds or mixtures of the two) in order to produce display screens displaying (a) color(s) which can be switched to the function of the temperature, that is to say of the voltage applied to the terminals of the transparent electrode.

The invention is targeted at overcoming the problems, and in particular the problem of a relative mediocre stability, of the transparent electrodes of the prior art in the presence of chemical and electrical stresses and in particular when they are brought into contact with thermochromic compounds.

To this end, the invention provides a display screen comprising:
- a substrate made of a plastic material,
- at least one transparent heating element,
- at least one thermochromic compound, characterized in that the at least one transparent heating element comprises at least one metal nanowire which is optionally functionalized.

Preferably, the heating element which is the metal nanowire is made of a metal chosen from silver, gold, copper, platinum, palladium, nickel, cobalt, rhodium, iridium, ruthenium and iron.

More preferably, the nanowire is made of a metal chosen from silver, gold and copper.

This nanowire can be functionalized. In this case, it comprises, at its external surface, a self-assembled monomolecular layer. In this case, it comprises at its external surface a self-assembled monomolecular layer formed from at least one molecule of following formula I:

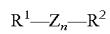  Formula I in which:

Z represents a sulfur or selenium atom, n=1 or 2, $R^1$ and $R^2$ each represent, independently of one another, a hydrogen atom or a saturated or unsaturated and linear, branched or cyclic hydrocarbon group which is optionally perfluorinated or partially fluorinated, which comprises from 1 to 100 carbon atoms and which optionally comprises one or more heteroatoms and/or one or more chemical functional groups comprising at least one heteroatom and/or one or more aromatic or heteroaromatic groups, or a chemical functional group comprising at least one heteroatom or one aromatic or heteroaromatic group which is substituted or unsubstituted.

In a first preferred embodiment of the process of the invention, in the formula I, $R^1$ is H, Z is S and $R^2$ is a saturated $C_3$ to $C_{18}$ alkyl chain.

More preferably, the molecule of formula I is chosen from 1-propanethiol, 1-decanethiol and 1-octadecanethiol.

In a second preferred embodiment of the process of the invention, in the formula I, $R^1$ is H, Z is S and $R^2$ is a substituted or unsubstituted $C_4$ to $C_{10}$ aromatic group. More preferably, the molecule of formula I is chosen from benzenethiol, 4-methoxybenzenethiol or 4-trifluoromethylbenzenethiol.

With regard to the thermochromic compound, it can be chosen from any thermochromic compound known to a person skilled in the art.

However, preferably, it is chosen from crystal violet lactone, vanadium dioxide $VO_2$ and the mixtures of these. In particular and preferably, the thermochromic compound is crystal violet lactone.

With regard to the material of the substrate, it is preferably chosen from polyethylene naphthalate (PEN), polyethylene terephthalate (PET), polymethyl methacrylate (PMMA) and a silicone, a woven or nonwoven textile based on cotton or on polyamide.

In order to be flexible and optionally drawable, the substrate preferably has a thickness of between 2 and 500 µm inclusive. More preferably, this thickness is from 2 to 200 µm inclusive. More preferably still, the thickness of the substrate is between 2 and 100 µm inclusive.

The display screen of the invention can additionally comprise an encapsulation layer made of a polymer material preferably chosen from an ethylene/vinyl acetate (EVA) polymer, a vinyl butyral polymer (PVB) and a urethane polymer.

The display screen of the invention can also furthermore comprise an insulation layer, preferably made of silicone, on the substrate or between the at least one transparent heating element and the at least one thermochromic compound.

The invention also provides a process for the manufacture of a display screen, characterized in that it comprises a step of deposition, over all or part of the surface of a substrate made of a plastic material, of at least one heating element comprising at least one metal nanowire, this nanowire being optionally functionalized, and of at least one thermochromic compound.

Preferably, the nanowire is made of a metal chosen from silver, gold, copper, platinum, palladium, nickel, cobalt, rhodium, iridium, ruthenium and iron. Preferably, the nanowire is made of a metal chosen from silver, gold and copper.

When the nanowire is functionalized, this functionalization is obtained by a step of formation of a self-assembled monomolecular layer obtained from at least one molecule of following formula I:

$$R^1-Z_n-R^2 \qquad \text{Formula I}$$

in which:

Z represents a sulfur or selenium atom, n=1 or 2, $R^1$ and $R^2$ each represent, independently of one another, a hydrogen atom or a saturated or unsaturated and linear, branched or cyclic hydrocarbon group which is optionally perfluorinated or partially fluorinated, which comprises from 1 to 100 carbon atoms and which optionally comprises one or more heteroatoms and/or one or more chemical functional groups comprising at least one heteroatom and/or one or more aromatic or heteroaromatic groups, or a chemical functional group comprising at least one heteroatom or one aromatic or heteroaromatic group which is substituted or unsubstituted.

In a first preferred embodiment of the process of the invention, in the formula I, $R^1$ is H, Z is S and $R^2$ is a saturated $C_3$ to $C_{18}$ alkyl chain. More preferably, the molecule of formula I is chosen from 1-propanethiol, 1-decanethiol and 1-octadecanethiol.

In a second embodiment of the process of the invention, $R^1$ is H, Z is S and $R^2$ is a substituted or unsubstituted $C_4$ to $C_{10}$ aromatic group.

More preferably, the molecule of formula I is chosen from benzenethiol, 4-methoxybenzenethiol and 4-trifluoromethylbenzenethiol.

In a second preferred embodiment of the process of the invention, $R^1$ is H, Z is S and $R^2$ is a substituted or unsubstituted $C_4$ to $C_{10}$ carbon aromatic group; more preferably, the molecule of formula I is chosen from benzenethiol, 4-methoxybenzenethiol and 4-trifluoromethylbenzenethiol.

In the process of the invention, the at least one thermochromic compound is preferably chosen from crystal violet lactone, vanadium dioxide $VO_2$ and the mixtures of these. Most preferably, the thermochromic compound is crystal violet lactone.

The thermochromic compound can be deposited in the form of thermochromic microcapsules having variable compositions, based on organic compounds, inorganic compounds or a mixture of the two. These thermochromic compounds can in particular comprise liquid crystals.

A preferred thermochromic compound of the invention is a leuco dye, that is to say a molecule having a colored form and a transparent form.

With regard to the substrate, it is made of a plastic material preferably chosen from polyethylene naphthalate (PEN), polyethylene terephthalate (PET), polymethyl methacrylate (PMMA) and a silicone.

This substrate preferably has a thickness of between 2 and 500 µm inclusive. More preferably, the substrate has a thickness of between 2 and 200 µm inclusive. Most preferably, the substrate has a thickness of between 2 and 100 µm inclusive.

In a preferred embodiment, the process of the invention additionally comprises a step of deposition of a layer for encapsulation of the substrate obtained, this layer being made of a polymer material preferably chosen from an ethylene/vinyl acetate (EVA) polymer, a vinyl butyral polymer (PVB) and a urethane polymer.

The process of the invention can additionally comprise a step of deposition of an insulation layer on the surface of the substrate on which the deposition of the at least one heating element and of the at least one thermochromic compound is carried out. Preferably, this insulation layer is made of silicone. An insulation layer can also be deposited between the at least one heating element and the at least one thermochromic compound.

The deposition of the at least one nanowire can be carried out before the deposition of the at least one thermochromic compound or after the deposition of this thermochromic compound.

The deposition of the metal nanowire can be carried out by projection under pressure, the use of an inkjet machine or a spin coater, by flexography, by photogravure or also by use of a scraper.

A better understanding of the invention will be obtained and other advantages and characteristics of the invention will become more clearly apparent on reading the description which follows.

The invention provides a process for the manufacture of a flexible, transparent and optionally drawable display screen produced on plastic substrates by high-surface-area printing techniques and at low temperature (less than 150° C.)

For this, the display screens have to comprise materials possessing an optimum combination of high electrical conductivity, of optical transparency and of flexibility.

At the current time, there does not exist a transparent (light transmission of greater than 85% at 550 nm), flexible and optionally drawable screen which operates with thermochromic compounds.

The process of the invention makes it possible to obtain a transparent, that is to say having a transmission of greater than 85% of the wavelength of the light at 550 nm, flexible and optionally drawable screen which operates with one or more thermochromic compounds, a transparent heating film based on nanowires made of a metal, optionally an encapsulation layer and a power supply source.

This screen basically comprises a substrate made of plastic.

This substrate can be made of braided plastic fibers. The substrate has to be transparent and flexible, optionally drawable, operating with thermochromic compounds. This is very certainly due to the fact that there exists a preconception in the art relating to the chemical incompatibility between the metal nanowires and the thermochromic compounds.

To this end, the substrate will have a thickness of between 2 and 500 µm inclusive. Preferably, the substrate will have a thickness of between 2 and 200 µm inclusive. Most preferably, it will have a thickness of between 2 and 100 µm inclusive.

Mention may be made, as nonexhaustive examples, of a substrate made of polyethylene naphthalate (PEN), of polyethylene terephthalate (PET) or also silicone. This substrate may or may not be coated with an insulation layer made of silicone which can be polymerized thermally or under UV radiation, for example. A possible example is the use of the product Silicone Conformal Coating 422B from MG Chemicals. The silicone can be employed pure or as a mixture, for example with an epoxy resin, such as in the product Wearlon®. In this respect, an insulation layer, also made of silicone, can also be deposited between polymethyl methacrylate (PMMA), the thermochromic compound(s) and the network of nanowires and/or between the substrate coated with the thermochromic compound(s) and with the network of nanowires and the encapsulation layer.

The heating element is based on metal nanowires.

The term "metal nanowire" is understood to mean, in the invention, an object having a central part composed of a metal body with a structure related to a solid cylinder, the radius of which is less than 100 nm and the length of which is between 1 and 800 μm.

The metals used are preferably silver, gold, copper, platinum, palladium, nickel, cobalt, rhodium, iridium, ruthenium, iron and the mixtures of these. However, use will preferably be made of nanowires made of silver or of gold or of copper or mixtures of such nanowires.

These nanowires can be obtained in solution. They are synthesized from metal precursors reduced in solution. For example, for nanowires made of silver, use may be made of the method described in Hu et al., ACS Nano, 2010, 5, 2955-63. Copper nanowires can be obtained by the method described in B. J. Wiley et al., Advanced Materials, 2011, 23, pp. 4798-4803.

These metal nanowires can be functionalized by molecules. In this case, they will be functionalized by a step of formation, on their surface, of a self-assembled monomolecular layer obtained from one or precursors of following formula I:

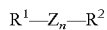    Formula I in which:

Z represents a sulfur or selenium atom, n=1 or 2, $R^1$ and $R^2$ each represent, independently of one another, a hydrogen atom or a saturated or unsaturated and linear, branched or cyclic hydrocarbon group which is optionally perfluorinated or partially fluorinated, which comprises from 1 to 100 carbon atoms and which optionally comprises one or more heteroatoms and/or one or more chemical functional groups comprising at least one heteroatom and/or one or more aromatic or heteroaromatic groups, or a chemical functional group comprising at least one heteroatom or one aromatic or heteroaromatic group which is substituted or unsubstituted.

Appropriate molecules of formula I are those of formula I in which $R^1$ is H, Z is S and $R^2$ is a saturated $C_3$ to $C_{18}$ alkyl chain or a substituted or unsubstituted $C_4$ to $C_{10}$ aromatic group.

Particularly preferred examples of molecules of formula I are 1-propanethiol, 1-decanethiol, 1-octadecanethiol, benzenethiol, 4-methoxybenzenethiol and 4-trifluoromethylbenzenethiol.

This functionalization can completely cover or partially cover, that is to say at least 10%, of the surface of the nanowires.

This heating element is obtained by deposition of the nanowires in the form of a network, so that the current can percolate over the whole of the layer thus formed.

This is because the metal nanowires are the connections which allow the current to circulate from one point to another of the electrode. If the network of nanowires is insufficiently dense, no conduction pathway is possible and the electrode is not conducting. Conversely, starting from a certain density of nanowires, the network becomes percolating and the charge carriers can be transported over the entire surface of the electrode.

As the conductivity of the electrodes is improved with the density of nanowires present (to the detriment of the transparency), the design of these electrodes is thus based on a transparency/conductivity compromise.

Typically, this heating element has a transmission of greater than 90%, measured at 550 nm, and a sheet resistance of less than 100 ohms/square.

More preferably, this heating element has a sheet resistance of less than 60 ohms/square.

With regard to the thermochromic compound used, any thermochromic compound known to a person skilled in the art, such as, for example, those cited in Thermochimica Acta, 2005, pp. 7-12, can be used. They are generally supplied in the form of an ink which can be of organic or inorganic nature or a mixture of the two.

Several thermochromic compounds can be used to form the display screen of the invention, in a variable amount, and to form variable surfaces and variable thicknesses. The thermochromic compound can, for example, change from a visible color to a transparent nature, or from one color to another.

Mention may be made, of examples of thermochromic compounds, of crystal violet lactone (CAS number: 1552-42-7) or vanadium dioxide $VO_2$ and the mixtures of these. Preferably, the thermochromic compound is crystal violet lactone.

Optionally, the combined substrate/heating element/thermochromic compound(s) structure can be covered with a transparent encapsulation layer of polymer type, for example with a poly(ethylene/vinyl acetate) (EVA) polymer or a poly(vinyl butyral) (PVB) polymer or a urethane polymer.

The display screen of the invention is manufactured by a process which makes it possible to produce, at low cost, display screens by large-surface-area printing techniques.

Thus, the depositions of layers of metal nanowires and/or of the thermochromic compounds can be carried out by vaporizing a solution comprising the nanowires or the thermochromic compound over the substrate. This technique consists in generating microdroplets comprising the nanowires or the thermochromic compounds and in projecting them under pressure over the substrate. The substrate can be heated during or after this deposition, for example between 20 and 120° C.

However, another method is the use of inkjet machines. Yet another method is the use of a spin coater.

However, as will be clearly apparent to a person skilled in the art, this deposition can also be carried out by flexography, photogravure or scraper.

In order to improve the performance of the electrodes constituting the heating element, it may be necessary to anneal the network of nanowires at a temperature of between 50 and 150° C.

Optionally, two nontransparent conducting strips can be deposited on the edges of the conducting surface based on nanowires deposited on the substrate. These strips can, for example, be made from silver paste or lacquer, in order to make possible a better connection with the external power supply systems.

The nanowires can be deposited before or after the thermochromic compounds.

It is also possible to deposit an encapsulation layer coating the substrate/heating element structure.

It is also possible to provide for the deposition of an insulation layer between the substrate and the heating element which the thermochromic compounds and/or between the heating element and the thermochromic compounds; this layer can be made of silicone.

The ink comprising the thermochromic compound or compounds can be deposited over the entire surface of the substrate or in localized fashion. For example, a pattern can be vaporized through a stencil in order to obtain a defined form. The thermochromic compound(s) can also be deposited locally by deposition of drops at certain points, by inkjet.

With regard to the heating element comprising the metal nanowires, it can also be deposited over the entire surface of the substrate or in localized fashion, care being taken on each occasion to create conductor tracks which can be connected to a power supply.

For example, a pattern can be vaporized through a stencil in order to produce a defined shape. It is also possible to use a laser, for example an excimer laser with an energy of 10 to 1000 mJ/cm$^2$, preferably between 20 and 200 mJ/cm$^2$. In this case, the deposition of the nanowires is carried out on the whole surface and the laser is applied locally in order to remove any undesired part by excimer laser ablation.

The power supply for the display screen can be permanent or mobile, that is to say be a battery or a photovoltaic cell, and be fed continuously or non-continuously.

Thus, it is possible to keep the heating element lightly supplied in order to stabilize the device at a desired temperature, for example in order to prevent any phenomenon of icing up for external displays, for example.

In order to make the invention better understood, several embodiments thereof will now be described.

Example 1

Silver nanowires are manufactured according to the following process:

1.766 g of PVP (polyvinylpyrrolidone) are added to 2.6 mg of NaCl (sodium chloride) in 40 ml of EG (ethylene glycol). The mixture is stirred at 600 revolutions per minute (rpm) at 120° C. until the PVP+NaCl has completely dissolved (approximately 4-5 minutes). This mixture is added dropwise, using a dropping funnel, to a solution of 40 ml of EG in which 0.68 g of AgNO$_3$ (silver nitrate) is dissolved. The oil bath is heated to 160° C. and stirring is allowed to take place at 700 rpm for 80 minutes. Three washing operations are carried out with methanol, centrifuging being carried out at 2000 rpm for 20 min, then the nanowires are precipitated with acetone and, finally, redispersed in water or methanol.

The electrodes are produced on PEN (polyethylene naphthalate) with a thickness of 125 µm by vaporization of the solution using an Aztek A4709 airbrush or by spin coating.

The substrates thus formed have a sheet resistance of 35 ohms/square at 91% transmission (at 550 nm).

A localized deposition of thermochromic ink based on p-methylphenol and on hexadecanol and on crystal violet lactone is carried out on the transparent electrode.

Heating is obtained by application of a voltage of 6 V to the electrode.

At the temperature of approximately 45° C., the zone defined by the thermochromic compound which was dark blue became transparent.

After cooling, the blue color reappeared. The cycle is thus repeated 10 times without modifying the reactivity of the thermochromic compound.

Example 2

Gold nanowires are manufactured according to the following process:

400 µl of HAuCl$_4$ (30% in HCl) are added to 2 ml of hexane and 10 ml of OA (oleylamine) at 80° C. Vigorous stirring is allowed to take place for 5 min and the mixture is left at this temperature, the stirring being switched off, for 5 h. The reaction mixture becomes very red. A precipitate (deep black product) is obtained by adding ethanol. After centrifuging at 3400 rev·min$^{-1}$ and washing with ethanol for 10 min, the nanowires are dispersed in hexane.

Electrodes are produced on PEN (polyethylene naphthalate) with a thickness of 10 µm by vaporization of the solution using an Aztek A4709 airbrush, the substrates being heated at 60° C.

The substrates thus formed have a sheet resistance of 55 ohms/square at 87% transmission (at 550 nm).

A localized deposition of thermochromic ink based on p-methylphenol and on hexadecanol and on crystal violet lactone is carried out on the transparent electrode.

Heating is obtained by application of a voltage of 6 V to the electrode.

At the temperature of approximately 45° C., the zone defined by the thermochrome which was dark blue becomes transparent.

After cooling, the blue color reappears. The cycle is carried out 10 times without modifying the reactivity of the thermochromic compound.

Example 3

Copper nanowires are manufactured according to the process described in the publication B. J. Wiley et al., Advanced Materials, 2011, 23, pp. 4798-4803.

Electrodes are produced on PEN (polyethylene naphthalate) with a thickness of 10 µm by vaporization of the solution using an Aztek A4709 airbrush, the substrate being heated at 65° C.

The substrates thus formed have a sheet resistance of 52 ohms/square at 91% transmission (at 550 nm).

A localized deposition of "Chameleon® Reversible Thermochromic Inks Red 47° C." ink, sold by B&H Colour Change, is carried out on the transparent electrode by vaporization.

Heating is obtained by application of a voltage of 6 V to the electrode.

At the temperature of approximately 47° C., the zone defined by the thermochromic compound which was red becomes transparent.

After cooling, the red color reappears. The cycle is thus repeated 10 times without modifying the reactivity of the thermochromic compound.

The invention claimed is:
1. A display screen, comprising:
a substrate made of a plastic material;
at least one transparent heating element; and
at least one thermochromic compound,
wherein said at least one transparent heating element comprises at least one metal nanowire which is functionalized and comprises, at an external surface, a self-assembled monomolecular layer formed from one or more precursor of molecule of formula I,

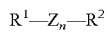 Formula I in which:
Z represents a sulfur or selenium atom,
n=1 or 2,
R¹ and R² each represent, independently of one another, a hydrogen atom or a saturated or unsaturated and linear, branched or cyclic hydrocarbon group which is optionally perfluorinated or partially fluorinated, which comprises from 1 to 100 carbon atoms and which optionally comprises one or more heteroatoms and/or one or more chemical functional groups comprising at least one heteroatom and/or one or more aromatic or heteroaromatic groups, or a chemical functional group comprising at least one heteroatom or one aromatic or heteroaromatic group which is substituted or unsubstituted.

2. The display screen according to claim 1, wherein the self-assembled monomolecular layer completely covers an external surface of the at least one metal nanowire.

3. A method for the manufacture of a display screen, said method comprising:
depositing, over all or part of a surface of a substrate made of a plastic material, of at least one heating element comprising at least one metal nanowire, the nanowire being functionalized by formation of a self-assembled monomolecular layer from at least one molecule of formula I,

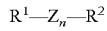 Formula I in which:
Z represents a sulfur or selenium atom,
n=1 or 2,
R¹ and R² each represent, independently of one another, a hydrogen atom or a saturated or unsaturated and linear, branched or cyclic hydrocarbon group which is optionally perfluorinated or partially fluorinated, which comprises from 1 to 100 carbon atoms and which optionally comprises one or more heteroatoms and/or one or more chemical functional groups comprising at least one heteroatom and/or one or more aromatic or heteroaromatic groups, or a chemical functional group comprising at least one heteroatom or one aromatic or heteroaromatic group which is substituted or unsubstituted.

4. The display screen according to claim 1, wherein the at least one functionalized metal nanowire comprises a metal chosen from silver, gold, copper, platinum, palladium, nickel, cobalt, rhodium, iridium, ruthenium, and iron.

5. The display screen according to claim 1, wherein in formula I, R¹ is H, Z is S, and R² is a saturated $C_3$ to $C_{18}$ alkyl chain or a substituted or unsubstituted $C_4$ to $C_{10}$ aromatic group.

6. The display screen according to claim 1, wherein formula I is one or more selected from 1-propanethiol, 1-decanethiol, 1-octadecanethiol, benzenethiol, 4-methoxybenzenethiol, and 4-trifluoromethylbenzenethiol.

7. The display screen according to claim 1, wherein at least one thermochromic compound is chosen from crystal violet lactone, vanadium dioxide, and mixtures thereof.

8. The display screen according to claim 1, wherein the substrate made of a plastic material is chosen from polyethylene naphthalate (PEN), polyethylene terephthalate (PET), polymethyl methacrylate (PMMA), and a silicone.

9. The display screen according to claim 1, wherein the substrate has a thickness of from 2 μm and 500 μm.

10. The display screen according to claim 1, further comprising an encapsulation layer, said layer comprising a material chosen from an ethylene/vinyl acetate (EVA) polymer, a vinyl butyral polymer (PVB), and a urethane polymer.

11. The display screen according to claim 1, wherein the substrate is coated with an insulation layer.

12. The method according to claim 3, wherein the self-assembled monomolecular layer completely covers an external surface of the at least one metal nanowire.

13. The method according to claim 3, wherein the at least one nanowire comprises a metal chosen from silver, gold, copper, platinum, palladium, nickel, cobalt, rhodium, iridium, ruthenium, and iron.

14. The method according to claim 3, wherein in formula I, R¹ is H, Z is S, and R² is a saturated $C_3$ to $C_8$ alkyl chain or a substituted or unsubstituted $C_4$ to $C_{10}$ aromatic group.

15. The method according to claim 3, wherein formula I is chosen from 1-propanethiol, 1-decanethiol, 1-octadecanethiol, benzenethiol, 4-methoxybenzenethiol, or 4-trifluoromethylbenzenethiol.

16. The method according to claim 3, wherein the depositing further comprises deposition of at least one thermochromic compound chosen from crystal violet lactone, vanadium dioxide, and mixtures thereof.

17. The method according to claim 3, wherein the plastic material is chosen from polyethylene naphthalate (PEN), polyethylene terephthalate (PET), polymethyl methacrylate (PMMA), and a silicone.

18. The method according to claim 3, wherein the substrate has a thickness of from 2 μm to 500 μm.

19. The method according to claim 3, further comprising the deposition of a layer for encapsulation of the substrate, said encapsulation comprising a polymer material chosen from an ethylene/vinyl acetate (EVA) polymer, a vinyl butyral polymer (PVB), and a urethane polymer.

20. The method according to claim 16, further comprising the deposition of an insulation layer on the surface of the substrate on which the deposition of the at least one metal nanowire and of the thermochromic compound is carried out.

21. The method according to claim 16, wherein the deposition of the at least one metal nanowire is carried out before the deposition of the thermochromic compound.

22. The method according to claim 16, wherein the deposition of the metal nanowire is carried out after the deposition of the thermochromic compound.

23. The method according to claim 3, wherein the deposition of the at least one metal nanowire is carried out by projection under pressure, the use of an inkjet machine or a spin coater, by flexography, by photogravure, or by use of a scraper.

* * * * *